United States Patent [19]
Hutchings

[11] Patent Number: 5,444,352
[45] Date of Patent: Aug. 22, 1995

[54] MULTI-LEVEL AUTOMOTIVE BATTERY CHARGING SYSTEM

[75] Inventor: Philip P. Hutchings, Calne, England

[73] Assignee: New Castle Battery Manufacturing Company, New Castle, Pa.

[21] Appl. No.: 101,551

[22] Filed: Aug. 2, 1993

[51] Int. Cl.6 ............... H01M 10/44; H01M 10/46; H02J 7/00
[52] U.S. Cl. ......................... 320/15; 320/6; 320/17
[58] Field of Search ............. 320/15; 322/90

[56] References Cited

U.S. PATENT DOCUMENTS

| | | | |
|---|---|---|---|
| 3,667,025 | 5/1972 | Campbell et al. | 320/15 |
| 3,671,843 | 6/1972 | Huntzinger et al. | 320/15 |
| 4,041,363 | 8/1977 | Scheidler | 320/15 |
| 4,090,122 | 5/1978 | Hoinski | 320/6 |
| 4,100,474 | 7/1978 | Pfeffer et al. | 320/17 |
| 4,498,551 | 2/1985 | Arbisi | 180/65.5 |
| 4,713,555 | 12/1987 | Lee | 307/66 |
| 4,723,079 | 2/1988 | Norton | 307/66 |
| 4,789,790 | 12/1988 | Yamanaka | 307/66 |
| 4,818,891 | 4/1989 | Drinkwater | 307/64 |
| 4,843,299 | 6/1989 | Hutchings | 320/31 |
| 4,985,819 | 1/1991 | Mori et al. | 363/37 |
| 5,049,804 | 9/1991 | Hutchings | 320/20 |
| 5,150,032 | 9/1992 | Ho | 320/14 |
| 5,160,851 | 11/1992 | McAndrews | 307/66 |

Primary Examiner—Thomas M. Dougherty
Assistant Examiner—Nicholas Ponomarenko
Attorney, Agent, or Firm—Volpe and Koenig

[57] ABSTRACT

An electric charging control unit is used to control charging of a dual voltage battery of an automobile electrical system. The charging control unit is used in conjunction with a standard 12 volt alternator or 12 volt charger to efficiently recharge a lead acid battery having both 12 and 16 voltage terminals. The electric charging control unit continually monitors the different voltage levels of the battery. Charging of higher voltage cells by a DC to DC converter is selectively activated when the voltage of the lower cells rises above a pre-determined voltage level. Activation of the charging of the higher voltage cells is selectively overridden in response to the voltage differential of the input and output of the DC to DC converter which are respectively coupled to the 12 and 16 volt battery terminals.

6 Claims, 4 Drawing Sheets

MULTI-LEVEL AUTOMOTIVE BATTERY CHARGING SYSTEM

FIELD OF THE INVENTION

The present invention pertains to devices for charging and/or re-charging electric storage batteries and, in particular, to battery charging systems for charging automotive batteries that have multiple voltage outputs.

BACKGROUND OF THE INVENTION

Twelve volt electrical systems for automobiles have become an industry standard. As the quest for improved vehicle performance and occupant safety has intensified, the importance of electrical systems in automobiles has become pivotal. Electronic ignitions and diagnostic engine monitoring computers have increased engine performance and efficiency. Anti-lock brakes, traction control, and air-bags have increased occupant safety in automobiles.

Although the importance and complexity of electrical systems and their components has increased, the basic electrical generation and storage mechanisms have remained relatively unchanged. Typically, a twelve volt automobile system is comprised of an alternator, a 12 volt, six cell, lead acid storage battery, a starter motor, an ignition system, and a variety of other electrical loads.

The alternator generates the power required by the electrical system during operation of the vehicle. The alternator takes the mechanical energy of the engine and produces current to charge a 12 volt lead acid battery and to supply the remaining electrical loads. The battery serves as a power source to start the engine and to power the electrical system when the engine is not running. While the engine is running, the alternator re-charges the battery and provides the primary source of current to the electrical system.

The various loads on the electrical system include fans, heaters, lights, pumps, and motors. Usually, the component with the largest current demand is the starter motor. The starter motor provides torque to the crankshaft to start the engine. Accordingly, the battery must be properly sized to meet the current requirements of the starter motor. Some weather conditions, e.g. during extremely cold weather, require higher starting torque. Higher torque may also be required due to certain engine modifications; for example, racing engine modifications.

In order to achieve better engine performance, racing automobile engines are commonly modified to increase the valve compression ratio by reducing the volume of the combustion chamber by special machining. An increase in the compression ratio results in higher torque being required to turn the crank shaft when the motor is started. Higher torque is particularly beneficial when restarting a hot high-compression racing engine. In a Direct Current (DC) starter motor, the current drawn varies in proportion to the mechanical torque applied to the motor output shaft.

The increased torque required to start a highly tuned racing engine results in a proportional increase in the DC current required to operate the starter motor effectively. This increased current, flowing in the starter circuit of the vehicle, causes an increase in the voltage drop due to resistive dissipation in the cables, starter motor armature windings, and in the internal resistance of the vehicle battery. To offset the increased voltage drop, some racing automobiles are fitted with specially designed 16 volt batteries having eight cells.

In addition to the requirement for increased starting torque, it may be desirable to increase the operating speed and performance of other electro-mechanical components such as fluid pumps, solenoids, relays, and other electrical components. Improved performance of the engine in horsepower and torque may result from a hotter spark in an ignition using 16 volts.

There is, however, a disadvantage to having a battery with a single higher output voltage. Voltage charging levels as high as 20 volts are required to recharge a 16 volt battery. Many electrical components, particularly electrolytic capacitors, integrated circuits, and instrumentation, are sensitive to voltage increases and could be damaged by the higher voltage. To avoid these undesired effects, a three terminal battery has been developed which has a common negative terminal and both 12 and 16 volt positive terminals. Therefore, electrical components of the automobile can be powered selectively from either voltage as required for optimum performance.

Lead acid storage batteries are the most commonly used batteries in automobiles. These batteries must be recharged in order to replace the energy taken from the battery and maintain the specific gravity of the liquid electrolyte. Conditions of under-charging or overcharging a lead acid battery will reduce the effectiveness and the expected life of the battery. Lead acid batteries are typically recharged at a voltage of between 2.3 volts and 2.5 volts per cell, therefore the charge voltage required by the battery depends upon the number of cells in the battery. The standard charging system installed in most automobiles is designed to charge 12 volt (6 cell) batteries, and cannot easily be modified to charge 16 volt (8 cell) batteries.

Conventional battery charging schemes for recharging dual voltage batteries, or batteries with increased voltage levels, required the use of special external AC powered 16 volt battery chargers or 16 volt voltage alternators. These charging schemes utilize a single higher voltage output across the ground and 16 volt terminals of the battery. Since discharging of the lower six (6) cells may occur at a different rate than the higher two (2) cells, a cell imbalance will occur. Over a number of charge and discharge cycles, the cell imbalance will result in the lower six (6) cells becoming completely discharged and the upper two (2) cells being continually overcharged in an attempt to charge the whole battery.

There is an example of a multiple voltage battery charging scheme that does not use high voltage alternators or external AC chargers disclosed in U.S. Pat. No. 4,723,079 (Norton). In Norton, a scheme is utilized in which a generator supplies a plurality of voltage levels through a series of voltage regulators. Such charging systems are relatively costly and/or complex.

SUMMARY OF THE INVENTION

The present invention provides for a dual voltage automobile electrical system having a simple, low cost dual voltage, three terminal battery charging system. The charging system is comprised of a charging control unit which is used in conjunction with a standard 12 volt alternator or 12 volt charger to efficiently recharge a lead acid battery having both 12 and 16 voltage terminals.

The electronic charging control unit continually monitors the different voltage levels of the battery. Charging of higher voltage cells by a DC to DC converter is selectively activated when the voltage of the lower cells rises above a pre-determined voltage level. Activation of the charging of the higher voltage cells is selectively overridden in response to the voltage differential of the input and output of the DC to DC converter which are respectively coupled to the 12 and 16 volt battery terminals. Thus, proper charging is ensured at each voltage level to maintain the effectiveness and the expected life of the battery. Additionally, voltage sensitive 12 volt loads can remain connected to the 12 volt terminal of the battery without being subject to the potentially damaging voltage required to charge a 16 volt battery.

An object of the invention is to provide an efficient charging system for a storage battery having multiple voltage levels.

Other objects and advantages will be apparent to those skilled in the art from the following description of a presently preferred embodiment.

DESCRIPTION OF A PREFERRED EMBODIMENT

Figure 1:
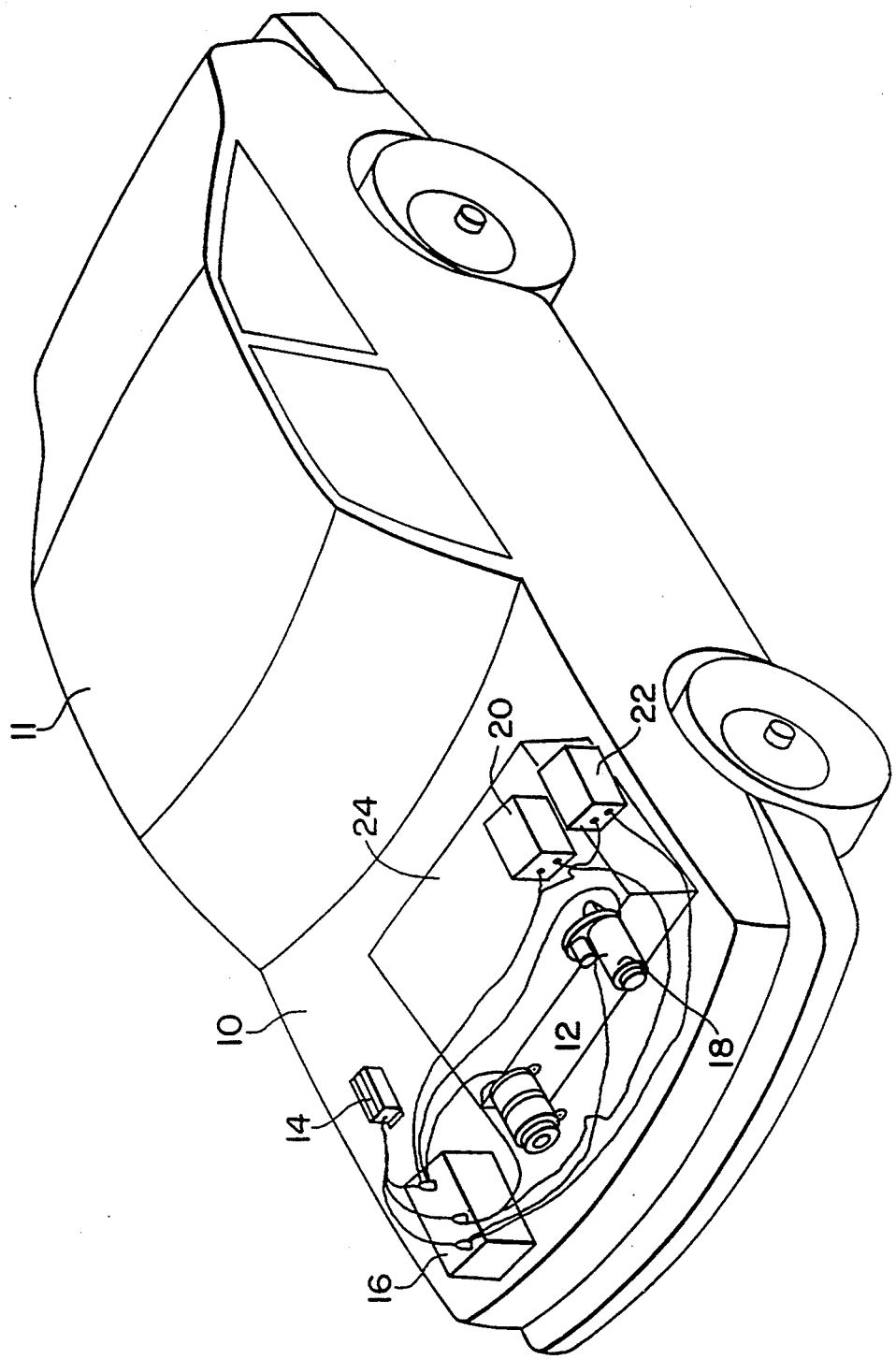
FIG. 1 is a schematic representation of an automotive electrical system made in accordance with the teachings of the present invention.

Referring to FIG. 1, a multi-voltage electrical system 10 for a vehicle, such as an automobile 11, is shown. The electrical system 10 comprises an alternator 12, a charging control unit 14, a three terminal lead acid storage battery 16, a starter motor 18, and a variety of other 12 and 16 volt electrical loads, schematically illustrated by blocks 20 and 22, respectively. The 12 volt loads 20 typically comprise the automobile's lighting, sound systems and instrumentation. To provide a hotter spark for increased fuel efficiency, the automotive ignition system can comprise one of the 16 volt loads 22. Other devices such as fans and pumps can comprise additional 16 volt loads 22 for improved performance.

The alternator 12 is operatively associated with the automobile engine 24. While the engine 24 is running, the alternator 12 generates the power required by the electrical system 10. The alternator 12 produces current to charge the lead acid battery 16 and to supply electrical loads 20 and 22.

In some racing applications, the electrical systems do not include an alternator, but rely upon the battery for power during the operation of the racing engine. In such case, the battery is charged by an external charger. The charging control unit 14 operates equally effectively where the three-post battery is charged using a standard 12 volt charger.

The charge control unit 14 converts the voltage output of the alternator to a higher voltage level. This higher voltage is used to charge the upper most positive 2 cells of the battery and to power selected 16 volt loads 22.

The starter motor 18, is operatively associated with the automobile engine 24, to provide mechanical torque to the crankshaft to start the engine 24. Normally, the starter motor 18 is only operated when the engine is not running and is powered by the higher voltage of the battery 16. The amount of current drawn by the starter motor 18 varies in proportion to the mechanical torque applied by the starter motor 18. Accordingly, the battery 16 must be properly sized to meet the current requirements of the starter motor 18.

In order to maintain the electric system 10 in proper working order, the battery 16 must be properly charged. Battery charging of the 12 volt portion of the battery is controlled by the voltage regulator of the alternator 12. Battery charging of the 16 volt portion of the battery is controlled by the charging control unit 14.

Figure 2:
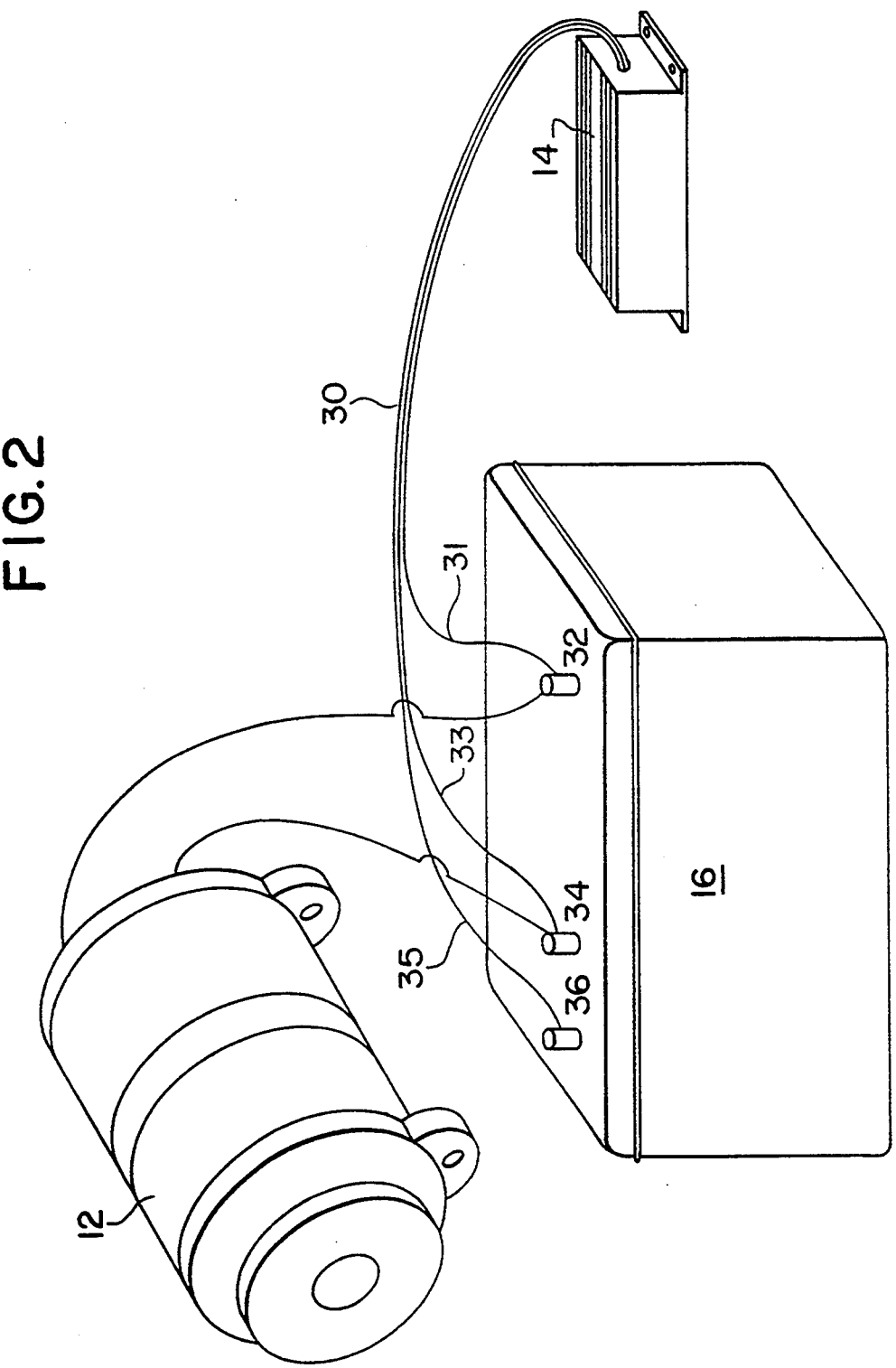
FIG. 2 is a pictorial representation of the charging control unit embodying the present invention connected to the battery of an automobile as shown in FIG. 1.

As best seen in FIG. 2, the alternator 12 is connected to the ground and 12 volt battery terminals 32, 34. The alternator 12 typically supplies current to the positive 12 volt terminal 34 of the battery 16 at a voltage of between 14.2 to 15.5 volts. However, if the charge on the battery is extremely low, the current drawn by the battery from the alternator can drop the voltage to as low as 9 volts. The voltage at the positive 12 volt terminal 34 begins to increase as the battery 16 re-charges. The voltage will increase to above 13.0 volts as the lower six (6) cells of battery 16 become charged.

The charging control unit 14 is electrically coupled to the alternator 12 and battery 16, by a three conductor cable 30. The three conductors 31, 33, 35 are connected to the ground terminal 32, the positive 12 volt terminal 34, and the positive 16 volt terminal 36, respectively, of the battery 16.

Figure 3:
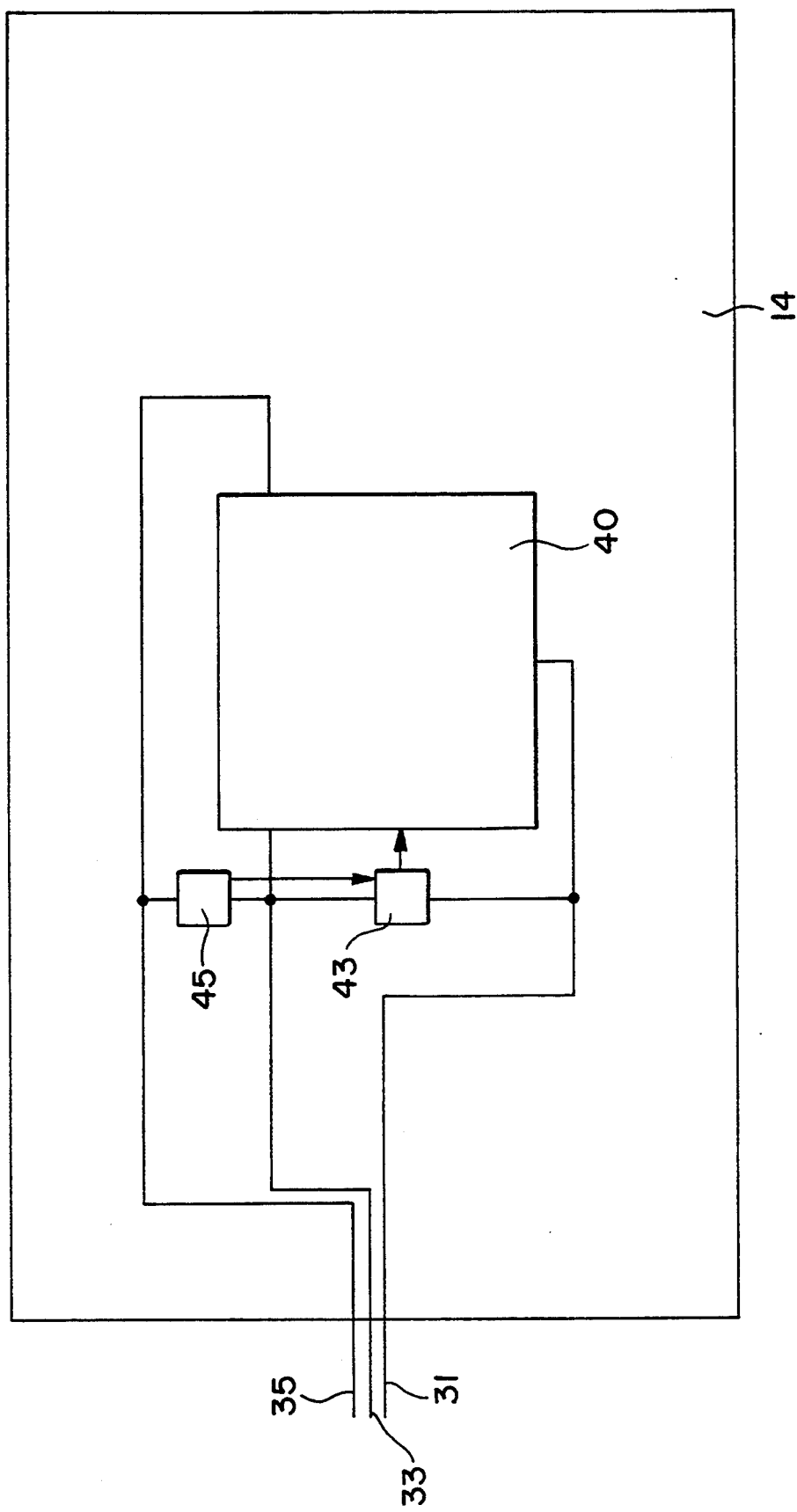
FIG. 3 is a block diagram of the charging control unit of the system shown in FIG. 1.

As shown in FIG. 3, the charging control unit 14 includes a DC to DC convertor 40 which converts the lower voltage supplied through input conductor 33 to higher voltage which is output via conductor 35. Two voltage comparators 43 and 45 monitor the voltage potential carried by conductors 33 and 35. The first comparator 43 monitors the voltage potential between the voltage carried by the 12 volt conductor 33 and the ground conductor 31; the second comparator 45 monitors the voltage potential between the 12 volt conductor 33 and the 16 volt conductor 35.

In operation, the DC to DC convertor 40 is not activated until the first voltage comparator 43 detects a voltage of at least 13.0 volts. This prevents the charging of the upper battery cells from loading the lower cells when the lower cells are being re-charged or when the engine 24 is not running. This also prevents overloading the DC to DC converter 40 when the engine is started which could be caused by the draw of the starter motor 18 on the circuit.

As the voltage at the conductor 33 increases above 13.0 volts, the voltage comparator 43 increases the power through the DC to DC converter 40. Current through the DC to DC converter 40 gradually increases until the voltage comparator 43 detects a voltage of about 15.0 volts whereat a maximum throughput level is reached.

Activation of the DC to DC converter 40 is selectively overridden by the second voltage comparator 45. The voltage comparator 45 monitors the voltage potential between the 12 volt and 16 volt conductors 33, 35. While the DC to DC converter is activated this potential generally ranges between 4.2–5.4 volts which is dependent on the power draw of the battery in charging the top two battery cells. As the potential increases, the second voltage comparator 45 decreases the power through the DC to DC converter 40. When this potential reaches about 5.4 volts the upper battery cells are fully charged and the power through the converter 40 is minimized. This circuitry limits electrolyte loss in the top two cells of the battery which would occur with overcharging.

Figure 4:
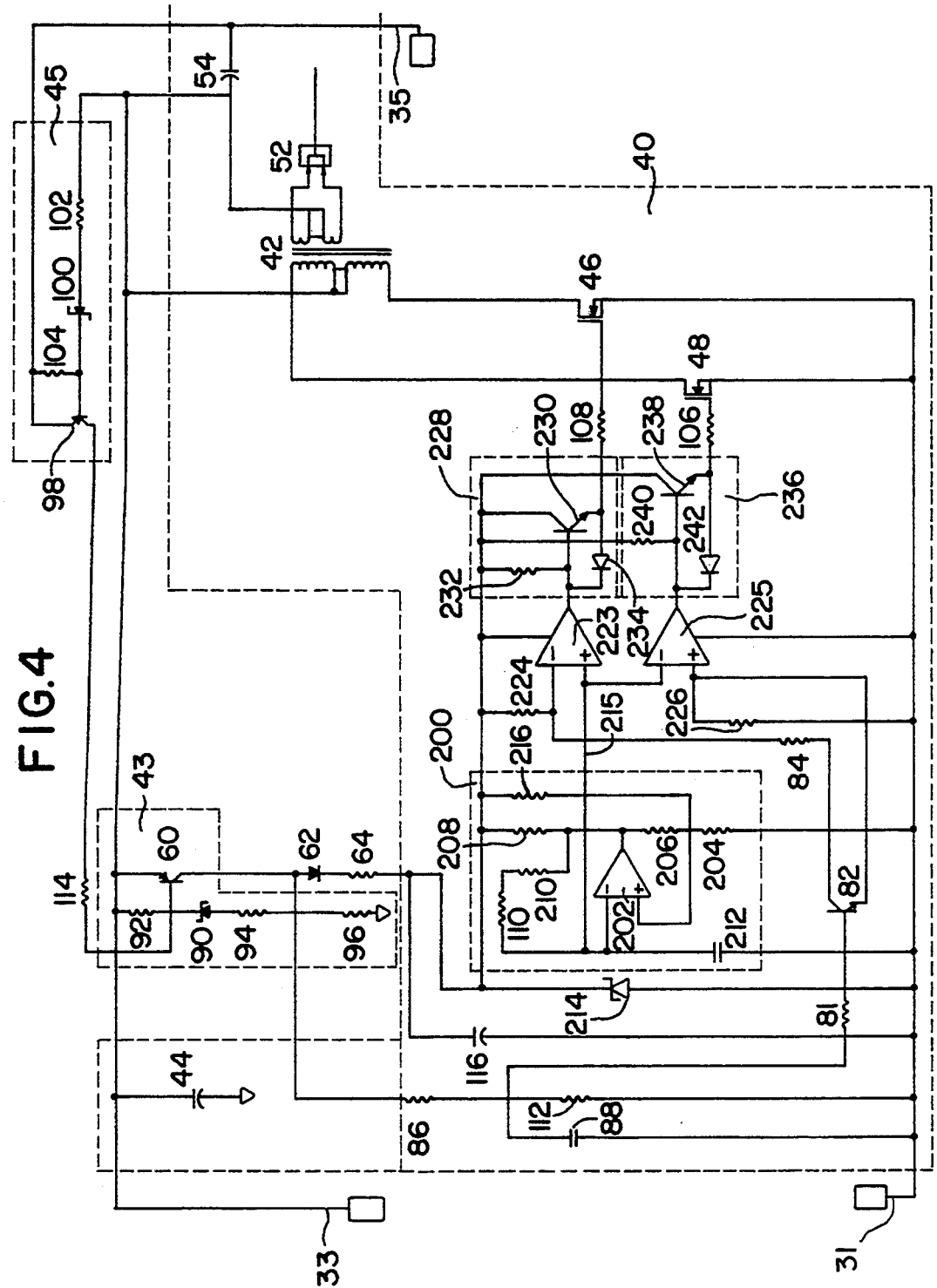
FIG. 4 is a schematic circuit diagram of the charging control unit of the system shown in FIG. 1.

As shown in FIG. 4, the first voltage comparator 43 includes a transistor 60, Zener diode 90, and a potential divider formed by resistors 92, 94, and 96. The 12 volt conductor 33 supplies current to the center tap of the primary winding of a transformer (or switch mode converter) 42 of the DC to DC converter 40.

A capacitor 44 filters the ripple components of the input voltage before it is fed to the transformer 42. Each side of the primary winding connects to a power MOSFET 46 and 48 which are further tied to the ground conductor 31.

The output winding of the transformer 42 is coupled to a Schottky rectifier 52 and a capacitor 54. The output voltage of the transformer is rectified by the rectifier 52 and then filtered by the charging and discharging of the capacitor 54. The negative end of the capacitor 54 is connected to the 12 volt conductor 33 so that the positive end of the capacitor 54 is charged to a voltage which is positive with respect to the voltage carried by the 12 volt conductor 33. The positive end of the capacitor 54 connects directly to the 16 volt conductor 35.

A self oscillating 100 KHz exponential ramp generator 200 in the DC to DC converter 40 includes a voltage comparator 202, resistors 204, 206, 208, 210, 216, and 110, and a capacitor 212. Power to the ramp generator 200 is supplied from the 12 volt conductor 33 via a diode 62 and a resistor 64 through a transistor 60 in the first comparator 43. A Zener diode 214 and a capacitor 116 regulate the supply voltage to the ramp generator 200 to 10 volts. The output line 215 of the ramp generator 200 oscillates between ⅓ and ⅔ the supply voltage.

The output line 215 is coupled to two voltage comparators 223, 225. These comparators 223, 225, with associated resistors 224, 226, compare the generated ramp waveform with a DC threshold level. The outputs of the comparators 223, 225 are active high pulses, 180 degrees out of phase, and of pulse width (or duty cycle) set by the DC threshold level.

The DC threshold level is set by a transistor 82 with a series limit resistor 84. As the supply voltage from transistor 60 increases, the voltage at the voltage divider formed by resistors 81, 86, 112 increases, and the voltage at the base of transistor 82 increases. This changes the DC threshold level and increases the duty cycle of the output pulses. A time constant resistor 86 and a capacitor 88 set the rate of change of the duty cycle.

The outputs of the voltage comparators 223, 225 are coupled to two current amplifiers 228, 236. The first current amplifier 228 comprising an emitter-follower transistor 230, a resistor 232, and a diode 234; the second current amplifier 236 comprising an emitter-follower transistor 238, a resistor 240, and a diode 242. The current amplifiers 228, 236 take the output waveforms of the voltage comparators 223, 225 and provide waveforms with fast rising edges to resistors 106 and 108, which are connected directly to the power MOSFET drivers 46 and 48.

The first voltage comparator 43 does not activate the DC to DC convertor 40 until the input battery voltage from the 12 volt conductor 33 reaches the preset threshold of 13.0 volts. As the voltage at the conductor 33 increases above 13.0 volts, the transistor 60 begins to turn on. This, in turn, raises the voltage at the base of the transistor 82, which increases the pulse width and current output of the DC to DC converter 40. Current output of the DC to DC converter 40 gradually increases to a maximum when voltage comparator 43 detects a voltage of 15.0 volts.

A transistor 98, a Zener diode 100, and resistors 102 and 104, comprise the second voltage comparator 45. This voltage comparator 45 monitors the voltage of the top two cells of the battery 16 via conductors 33, 35 across a capacitor 54 and overrides the first voltage comparator 43 as the top cells approach a fully charged state. Transistor 98 in the second voltage comparator 45 controls the base voltage of the transistor 60 in the first voltage comparator 43. As the voltage of the upper cells approaches a preset limit, (preferably 5.4 volts), transistor 98 begins to turn on and gradually turns off transistor 60. Thus, the first voltage comparator 43 decreases the voltage at the base of the transistor 82, thereby decreasing the pulse width and current output of the DC to DC converter 40. When the voltage of the upper cells reaches 5.4 volts, operation of the DC to DC converter 40 is completely terminated.

Although the invention has been described in part by making detailed reference to certain specific embodiments, such detail is intended to be instructive rather than restrictive. It will be appreciated by those skilled in the art that many variations may be made in the structure and mode of operation without departing from the spirit and scope of the invention, as disclosed in the teachings herein.

What is claimed is:

1. A multi-voltage automobile electrical system comprising:
   an electric storage battery having a ground terminal and at least a first low level voltage terminal and a second high level voltage terminal;
   an alternator coupled to said ground and first battery terminals for charging the low voltage level of said electric storage battery; and
   a charging control unit for controlled charging of the high voltage level of said electric storage battery including:
      DC to DC converter means having a low voltage input conductor coupled to said low voltage battery terminal and a high voltage output conductor coupled to said high voltage battery terminal for converting the voltage supplied at said low voltage battery terminal to a higher voltage for charging the high voltage level of the battery;
      means for activating said DC to DC converter means when at least a predetermined voltage level is being supplied to said input conductor of said DC to DC converter means, said activating means gradually increases the power through said DC to DC converter to a fully activated state as the voltage level rises above said predetermined voltage level, and
      means for overriding the activation of said DC to DC converter means responsive to the voltage differential between said input and output conductors of said DC to DC converter means, said override means gradually decreases the power through said DC to DC converter as the voltage differential between said input and output conductors increases.

2. A multi-voltage automobile electrical system according to claim 1, wherein:
said electric storage battery is a three terminal, lead-acid storage battery having a low 12 volt terminal, a high 16 volt terminal and a ground terminal;
said activating means gradually increases the power through said DC to DC converter to a fully activated state as the voltage level rises from 13.0 volts to 15.0 volts, and
said override means gradually decreases the power through said DC to DC converter to a minimum as the voltage differential between said input and output conductors increases to 5.4 volts.

3. An electric charging control unit for controlling the charging of an electric storage battery having a ground terminal and at least a first low level voltage terminal and a second high level voltage terminal, the battery being charged by a low voltage charging means coupled to the ground and first battery terminals, the charging control unit comprising:
DC to DC converter means having a low voltage input conductor and a high voltage output conductor for converting the voltage supplied at the low voltage battery terminal to a higher voltage for charging the high voltage level of the battery;
means for activating said DC to DC converter means when at least a predetermined voltage level is being supplied to the low voltage input conductor of said DC to DC converter said activating means gradually increases the power through said DC to DC converter to a fully activated state as the voltage level rises above said predetermined voltage level, and
means for overriding the activation of said first means responsive to the voltage differential between said input and output conductors of said DC to DC converter, said override means gradually decreases the power through said DC to DC converter as the voltage differential between said input and output conductors increases.

4. An electric charging control unit according to claim 3, wherein:
said predetermined voltage is 13.0 volts;
said activating means gradually increases the power through said DC to DC converter to a fully activated state as the voltage level rises from 13.0 volts to 15.0 volts, and
said override means gradually decreases the power through said DC to DC converter to a minimum as the voltage differential between said input and output conductors increases to 5.4 volts.

5. A combination multi-voltage electric storage battery, and electric charging control unit comprising:
an electric storage battery having a ground terminal and at least a first low level voltage terminal and a second high level voltage terminal; and
a charging control unit coupled to said first and second battery terminals for controlling the charging of the high voltage level of the battery, including:
DC to DC converter means having a low voltage input conductor and a high voltage output conductor for converting the voltage supplied at the low voltage battery terminal to a higher voltage for charging the high voltage level of the battery;
means for activating said DC to DC converter means when at least a predetermined voltage level is being supplied to the low voltage input conductor of said DC to DC converter; said activating means gradually increases the power through said DC to DC converter to a fully activated state as the voltage level rises above said predetermined voltage level; and
means for overriding the activation of said first means responsive to the voltage differential between said input and output conductors of said DC to DC converter such that said battery is completely charged by a low voltage charging means coupled to said ground and first battery terminals, said override means gradually decreases the power through said DC to DC converter as the voltage differential between said input and output conductors increases.

6. The combination according to claim 5, wherein:
said electric storage battery is a three terminal, lead-acid storage battery having a low 12 volt terminal, a high 16 volt terminal and a ground terminal;
said activating means gradually increases the power through said DC to DC converter to a fully activated state as the voltage level rises from 13.0 volts to 15.0 volts, and
said override means gradually decreases the power through said DC to DC converter to a minimum as the voltage differential between said input and output conductors increases to 5.4 volts.

* * * * *